US012621386B2

(12) United States Patent
Machida et al.

(10) Patent No.: US 12,621,386 B2
(45) Date of Patent: May 5, 2026

(54) INFORMATION PROCESSING DEVICE, INFORMATION PROCESSING METHOD, AND PROGRAM

(71) Applicant: NTT TECHNOCROSS CORPORATION, Tokyo (JP)

(72) Inventors: Kenichi Machida, Tokyo (JP); Kazuhira Matsui, Tokyo (JP); Takaaki Fukutomi, Tokyo (JP)

(73) Assignee: NTT TECHNOCROSS CORPORATION, Tokyo (JP)

( * ) Notice: Subject to any disclaimer, the term of this patent is extended or adjusted under 35 U.S.C. 154(b) by 114 days.

(21) Appl. No.: 18/695,752

(22) PCT Filed: Jan. 14, 2022

(86) PCT No.: PCT/JP2022/001146
§ 371 (c)(1),
(2) Date: Mar. 26, 2024

(87) PCT Pub. No.: WO2023/058256
PCT Pub. Date: Apr. 13, 2023

(65) Prior Publication Data
US 2025/0133164 A1 Apr. 24, 2025

(30) Foreign Application Priority Data

Oct. 4, 2021 (JP) ................................. 2021-163442

(51) Int. Cl.
*H04M 3/51* (2006.01)
(52) U.S. Cl.
CPC ..................................... *H04M 3/51* (2013.01)
(58) Field of Classification Search
None
See application file for complete search history.

(56) References Cited

U.S. PATENT DOCUMENTS

2011/0288866 A1* 11/2011 Rasmussen .......... G06Q 10/109
704/E15.001
2012/0259991 A1* 10/2012 Rozinov ............... H04L 67/147
709/228

FOREIGN PATENT DOCUMENTS

JP 2003092632 A 3/2003
JP 2014187583 A 10/2014
JP 2017169037 A 9/2017

OTHER PUBLICATIONS

"CTI middleware "CTBASE/Core"" (2024) NTT TechnoCross [online] website: https://www.ntt-tx.co.jp/products/ctbase/core.html.

* cited by examiner

*Primary Examiner* — Nafiz E Hoque

(57) ABSTRACT

The information processing device according to one embodiment includes: a setting part configured to pair and set, based on first information sent from a terminal that is connected via a communication network, user identification information with second information, the user identification information identifying a user using a given telephone machine, the second information being obtainable from a voice packet of a telephone call between the given telephone machine and another telephone machine, and the first information being predetermined information and the second information being predetermined information; and a specifying part configured to obtain, when a voice packet of a telephone call between the given telephone machine and another telephone machine arrives, the second information from the voice packet, and specify the user identification information paired with the second information obtained.

8 Claims, 12 Drawing Sheets

Figure 5:
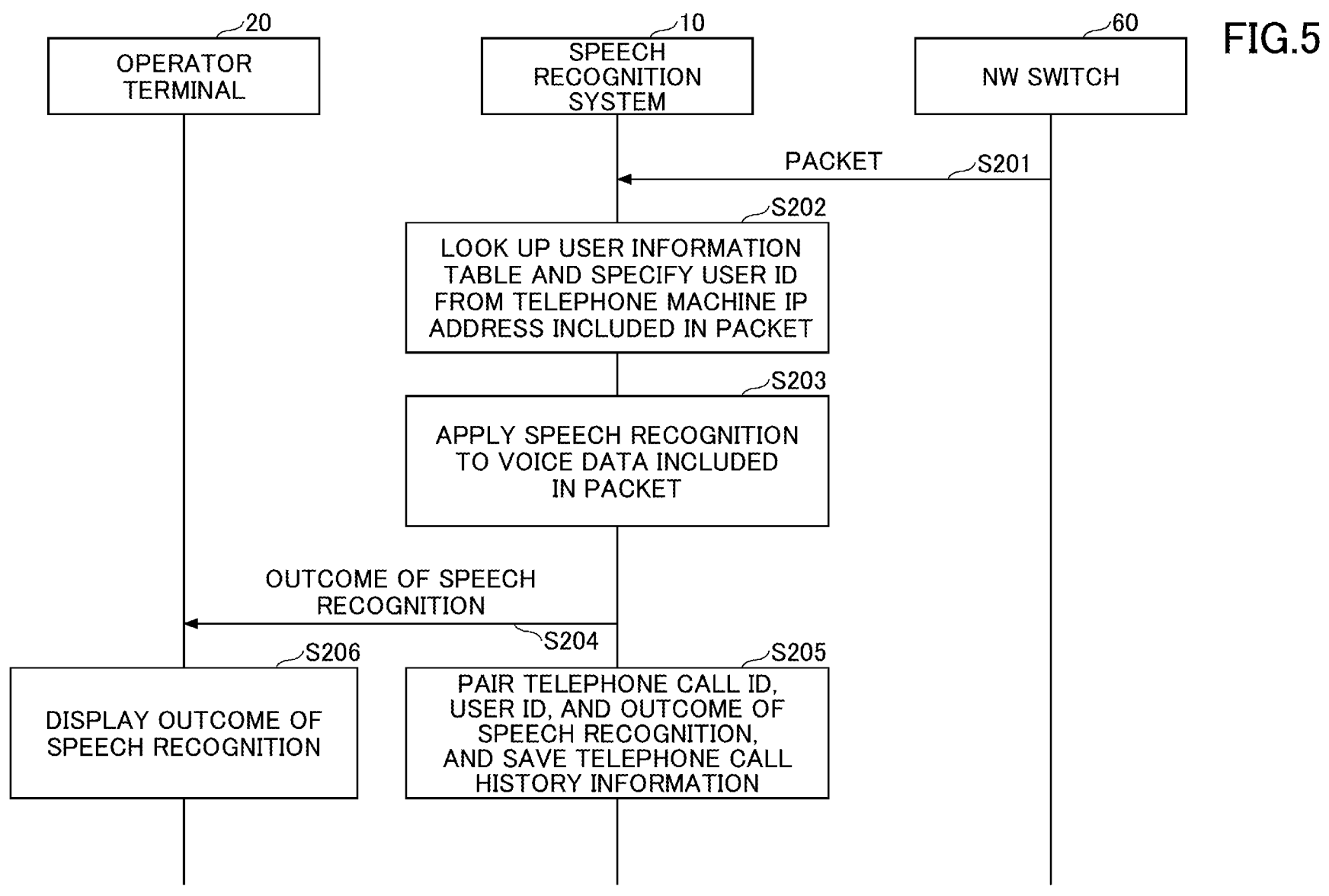

NW SWITCH

10

SPEECH RECOGNITION SYSTEM

20

OPERATOR TERMINAL

S201

PACKET

S202

LOOK UP USER INFORMATION TABLE AND SPECIFY USER ID FROM TELEPHONE MACHINE IP ADDRESS INCLUDED IN PACKET

S203

APPLY SPEECH RECOGNITION TO VOICE DATA INCLUDED IN PACKET

S205

PAIR TELEPHONE CALL ID, USER ID, AND OUTCOME OF SPEECH RECOGNITION, AND SAVE TELEPHONE CALL HISTORY INFORMATION

S204

OUTCOME OF SPEECH RECOGNITION

S206

DISPLAY OUTCOME OF SPEECH RECOGNITION

FIG.11

INFORMATION PROCESSING DEVICE, INFORMATION PROCESSING METHOD, AND PROGRAM

CROSS-REFERENCE TO RELATED APPLICATIONS

This application is a U.S. 371 Application of International Patent Application No. PCT/JP2022/001146, filed on 14 Jan. 2022, which application claims priority to and the benefit of JP Application No. 2021-163442, filed on 4 Oct. 2021, the disclosures of which are hereby incorporated herein by reference in their entireties.

TECHNICAL FIELD

The present invention relates to an information processing device, an information processing method, and a program.

BACKGROUND ART

In recent years, computer telephony integration (CTI) has been increasingly introduced in contact centers (also referred to as "call centers") in order to support operators' performance of duties, improve the efficiency of work, and improve the level of customer satisfaction. CTI refers to a mechanism for integrating and linking computers such as speech recognition systems and customer management systems, with telephone machines and private branch exchanges (PBXs) (see, for example, non-patent document 1). By introducing CTI, for example, it becomes possible to apply speech recognition to telephone calls at a contact center by allowing a speech recognition system and a PBX to work together. Hereinafter, introducing CTI and allowing computers, telephone machines, and PBXs to work together will also be referred to as "CTI cooperation."

Now, in recent years, an increasing number of contact centers have adopted "free-address" for seating operators. Free address refers to a system in which operators do not have fixed seats and can choose their seats freely or based on some rules. According to free address, an operator's seat may change every day; however, by using speech recognition with CTI cooperation, it becomes possible to pair up speech-recognized telephone calls and operators.

CITATION LIST

Non-Patent Document

Non-patent Document 1: "CTI middleware "CTBASE/Core"|NTT TechnoCross," Internet <URL: https://www.ntt-tx.co.jp/products/ctbase/core.html>

SUMMARY OF INVENTION

Technical Problem

However, while it is desirable to introduce a speech recognition system in a contact center to apply speech recognition to telephone calls, there are cases where it is difficult to introduce CTI due to various reasons. For example, a case might occur in which CTI cooperation is difficult to introduce because the existing PBX is not functionally compatible with CTI cooperation or lacks the capacity, and in which the cost of replacing the PBX is not affordable either.

In a case like this, especially in contact centers where free address is used, there is a problem that in which speech-recognized telephone calls and operators cannot be paired up. Consequently, it is not possible to pair up a given outcome of speech recognition with the operator telephone call to which it corresponds.

Embodiments of the present invention have made in view of the foregoing, and aim to pair up telephone calls and operators.

Solution to Problem

In order to achieve the above object, an information processing device according to an embodiment includes: a setting part configured to pair and set, based on first information sent from a terminal that is connected via a communication network, user identification information with second information, the user identification information identifying a user using a given telephone machine, the second information being obtainable from a voice packet of a telephone call between the given telephone machine and another telephone machine, and the first information being predetermined information and the second information being predetermined information; and a specifying part configured to obtain, when a voice packet of a telephone call between the given telephone machine and another telephone machine arrives, the second information from the voice packet, and specify the user identification information paired with the second information obtained.

Advantageous Effects of Invention

According to the present invention, telephone calls and operators can be paired.

BRIEF DESCRIPTION OF DRAWINGS

FIG. 5 is a sequence diagram that illustrates an example of speech recognition processing according to the first embodiment;

FIG. 11 is a diagram for explaining an example application (part 1); and

DESCRIPTION OF EMBODIMENTS

First and second embodiments of the present invention will be described below. A contact center system 1 will be described in the following embodiments; at a contact center, speech recognition is applied to telephone calls (voice calls) with customers, so that a telephone call and the operator answering the telephone call can be paired without using CTI cooperation. However, a contact center is one example, and, besides a contact center, the present invention can be used when, for example, targeting people working in an office, and pairing a telephone call and the person answering the telephone call. More generally, the present invention can be used when pairing a telephone call and the person answering that telephone call.

First Embodiment

Figure 1:
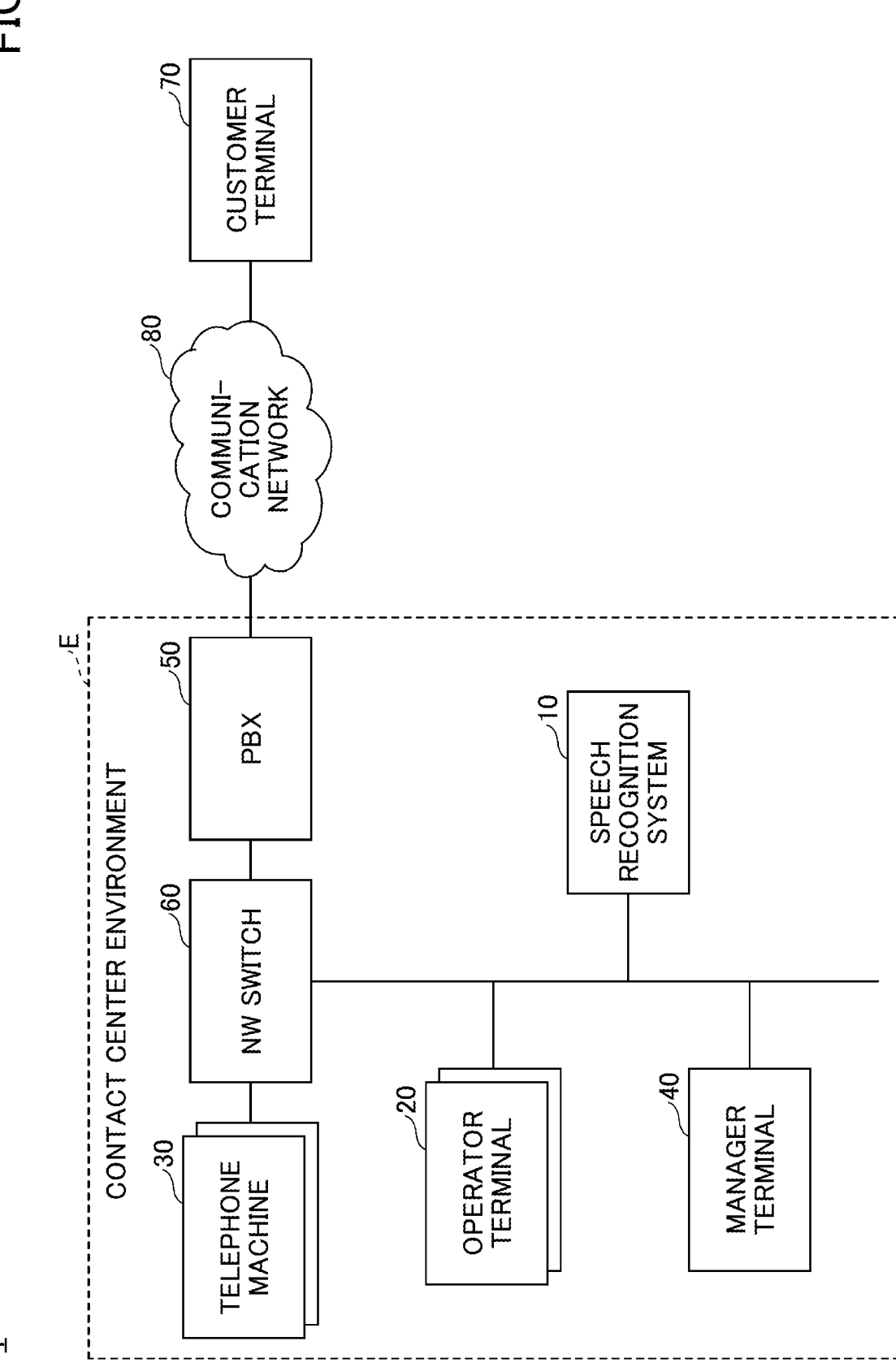
FIG. 1 is a diagram that illustrates an example overall structure of a contact center system according to a first embodiment.

First, a first embodiment will be described.
<Overall Structure of Contact Center System 1>
An example overall structure of the contact center system 1 according to this embodiment is illustrated in FIG. 1. As illustrated in FIG. 1, the contact center system 1 according to this embodiment includes a speech recognition system 10, multiple operator terminals 20, multiple telephone machines 30, one or more manager terminals 40, a PBX 50, a NW switch 60, and a customer terminal 70. Here, the speech recognition system 10, operator terminals 20, telephone machines 30, manager terminal 40, PBX 50, and NW switch 60 are installed in a contact center environment E, which is the contact center's system environment. Note that the contact center environment E is not limited to being a system environment within the same building, and may be, for example, a system environment spanning multiple buildings that are geographically separate.

The speech recognition system 10 converts a telephone call between a customer and an operator into text by applying speech recognition on packets (voice packets) sent from the NW switch 60, and also specifies the operator answering the telephone call.

The operator terminal 20 is a terminal that the operator uses, such as a personal computer (PC). The telephone machine 30 is an Internet protocol (IP) telephone machine (such as a fixed IP telephone machine or a mobile IP telephone machine) used by the operator. In the following description, it is assumed that free address is adopted at a contact center, and that an operator's seat may change every day (or, for example, at some timing, such as between morning and afternoon, or when switching his/her duties). Now, in a typical contact center, it is usually the case that one operator terminal 20 and one telephone machine 30 are installed at every operator's seat, and the IP address of the operator terminal 20 and the IP address of the telephone machine 30 are paired on a fixed, one-to-one basis. Accordingly, this embodiment will also assume such a contact center, where one operator terminal 20 and one telephone machine 30 are installed at every operator's seat, and where the IP address of the operator terminal 20 and the IP address of the telephone machine 30 are paired on a fixed, one-to-one basis. To be more specific, for example, one operator terminal 20 and one telephone machine 30 are installed on the desk where each operator is seated, and the IP address of the operator terminal 20 and the IP address of the telephone machine 30 are assigned on a fixed basis. It is assumed here that the IP addresses of the operator terminal 20 and telephone machine 30, installed at the same seat, are paired together.

The manager terminal 40 is a terminal that a manager who manages multiple operators uses (such a manager is also referred to as a "supervisor"), such as a PC. Note that, although only one manager terminal 40 is shown in the example illustrated in FIG. 1, multiple manager terminals 40 may be present.

The PBX 50 is a private branch exchange (IP-PBX) and is connected to a communication network 80 that includes a voice-over-Internet protocol (VOIP) network and a public-switched telephone network (PSTN).

The NW switch 60 relays packets between the telephone machine 30 and the PBX 50, captures the packets, and sends them to the speech recognition system 10.

The customer terminal 70 may be a variety of terminals used by customers, such as a smartphone, a mobile phone, a fixed-line telephone, and so forth.

Note that the overall structure of the contact center system 1 illustrated in FIG. 1 is an example, and other structures may be adopted as well. For example, although the speech recognition system 10 is included in the contact center environment E (in other words, the speech recognition system 10 is an on-premises system), all or part of the functions of the speech recognition system 10 may be implemented by a cloud service or the like. Similarly, in the example illustrated in FIG. 1, the PBX 50 is an on-premises private branch exchange, but it may also be provided by a cloud service as well.

Figure 2:
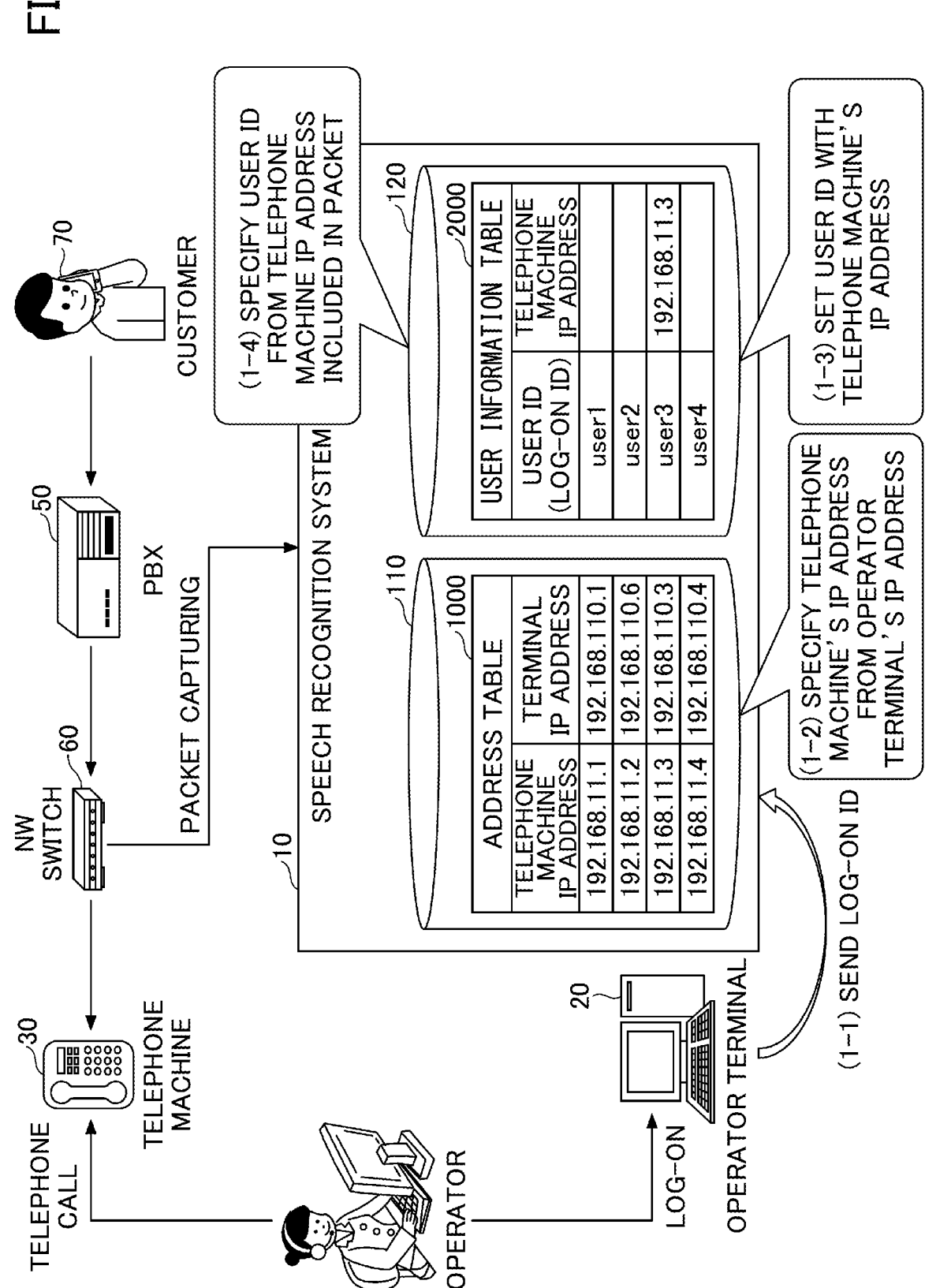
FIG. 2 is a diagram for explaining an example method of pairing up telephone calls and operators according to the first embodiment.

<Method of Pairing Telephone Calls and Operators>
An example method whereby telephone calls and operators are paired up in the contact center system 1 according to this embodiment will be described below with reference to FIG. 2. Here, it is assumed that each operator selects his/her seat and logs on to the operator terminal 20 of that seat by using his/her log-on ID when starting telephone answering duties. Also, if the operator no longer uses that seat, he/she shall log off from that seat's operator terminal 20. Note that, typically, an operator selects his/her seat for the day when arriving at work, but this is by no means limiting. For example, an operator may use different seats in the morning and afternoon, change the seat when his/her duties change, or change the seat at any other timing.

Also, in the following description, for ease of explanation, it is assumed that the user ID that identifies an operator and the log-on ID that the operator uses to log on to the operator terminal 20 match. However, as long as the user ID and the log-on ID are paired on a one-to-one basis, they do not necessarily have to match. Note that "log-on" as used herein may be interchangeable with "log-in."

The contact center system 1 according to this embodiment pairs up a telephone call and an operator through (1-1) to (1-4) below:
(1-1)
First, when an operator logs on to an operator terminal 20, the operator terminal 20 transmits the log-on ID used for the log-on to the speech recognition system 10.
(1-2)
The speech recognition system 10 includes an address table storage part 110 and a user information table storage part 120, in which an address table 1000 and a user information table 2000 are stored, respectively. In the address table 1000, the IP addresses of telephone machines 30 (hereinafter referred to as "telephone machine IP addresses") and the IP addresses of operator terminals 20 (hereinafter referred to as "terminal IP addresses"), paired up on a one-to-one basis, are stored. Also, in the user information table 2000, user IDs (log-on IDs) are stored such that the user IDs can be paired with the telephone machine IP addresses. Note that, for example, before the telephone machine IP addresses and the user IDs (log-on IDs) are paired, only the user IDs (log-on IDs) are stored in the user information table 2000 (or user IDs (log-on IDs) paired with NULL values or blanks instead of telephone machine IP addresses are stored).

In this setting, if the speech recognition system 10 receives a log-on ID from an operator terminal 20, the speech recognition system 10 looks up the address table 1000 and specifies the telephone machine IP address that is paired with the terminal IP address of the operator terminal 20. In the example illustrated in FIG. 2, for example, if the terminal IP address of the operator terminal 20 is "192.168.110.3", the telephone machine IP address "192.168.11.3" is specified.

(1-3)

Next, among the user IDs stored in the user information table 2000, the speech recognition system 10 pairs and sets the user ID that matches the log-on ID received from the operator terminal 20, with the telephone machine IP address specified in (1-2). In the example illustrated in FIG. 2, for example, if the log-on ID is "user3" and the telephone machine IP address specified in (1-2) is "192.168.11.3", the log-on ID "user3" and the telephone machine IP address "192.168.11.3" are paired up and set together.

(1-4)

Subsequently, when a telephone call takes place between a telephone machine 30 and a customer terminal 70 via the PBX 50, the NW switch 60 captures the packets (voice packets) of the telephone call and sends them to the speech recognition system 10. Note that the packets include the IP address (telephone machine IP address) of the telephone machine 30.

The speech recognition system 10 looks up the user information table 2000, and specifies the user ID that is paired with the telephone machine IP address included in the packets. As a result of this, the user ID of the operator answering the telephone call is specified, and the telephone call and the operator specified from the user ID are paired.

<Functional Structure of Contact Center System 1>

Figure 3:
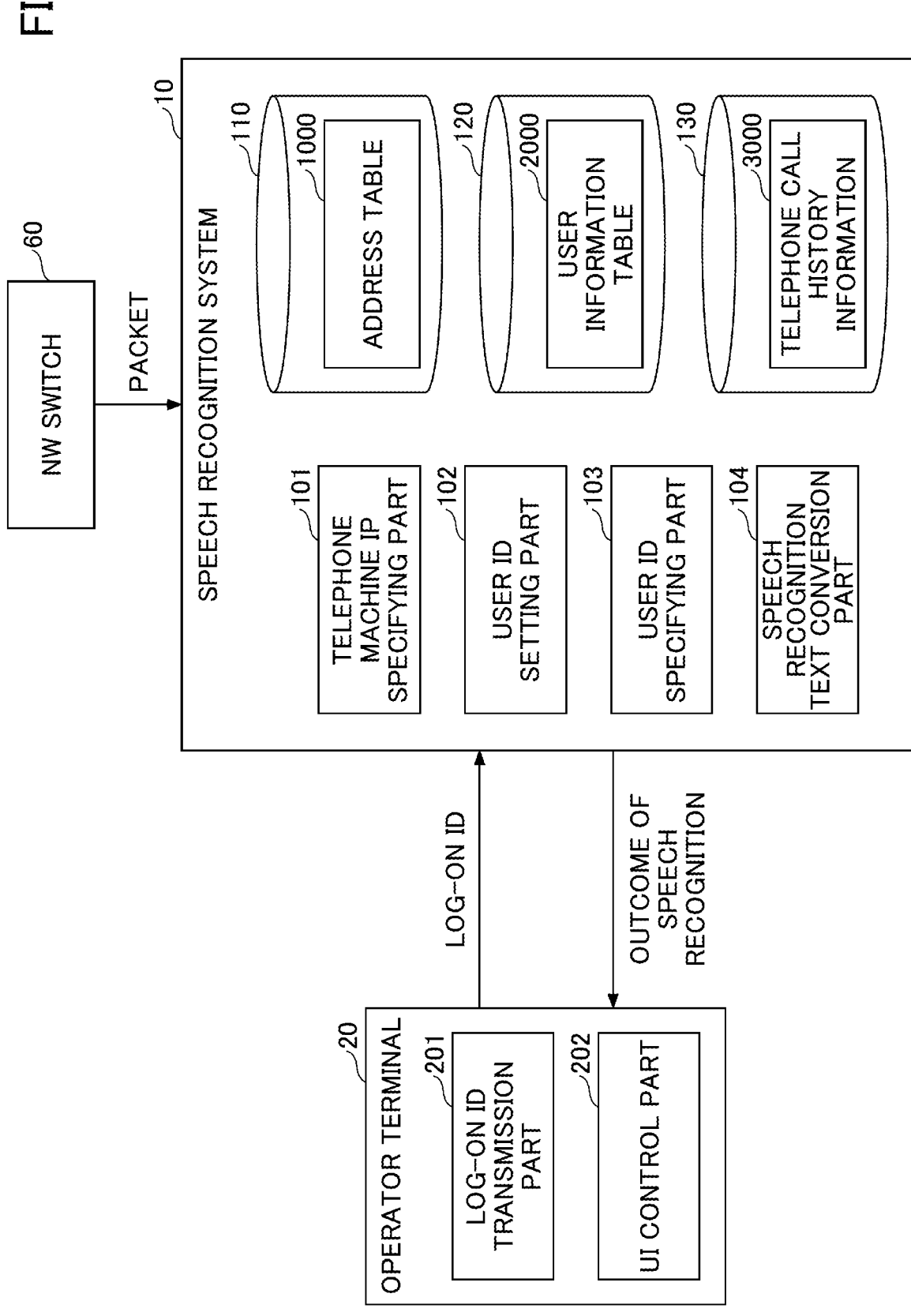
FIG. 3 is a diagram that illustrates an example functional structure of a contact center system according to the first embodiment.

FIG. 3 shows a functional structure of the speech recognition system 10 and operator terminal 20 included in the contact center system 1 according to this embodiment.

<<Speech Recognition System 1>>

As illustrated in FIG. 3, the speech recognition system 10 according to this embodiment includes a telephone machine IP specifying part 101, a user ID setting part 102, a user ID specifying part 103, and a speech recognition text conversion part 104. Each of these parts is implemented, for example, by a process executed on a processor such as a central processing unit (CPU) by one or more programs installed in the speech recognition system 10. Also, the speech recognition system 10 according to this embodiment includes an address table storage part 110, a user information table storage part 120, and a telephone call history information storage part 130. Each of these parts can be implemented by, for example, a storage device such as a hard disk drive (HDD), a solid state drive (SSD), or a flash memory.

The telephone machine IP specifying part 101 looks up the address table 1000 and specifies the telephone machine IP address from the terminal IP address.

Among the user IDs stored in the user information table 2000, the user ID setting part 102 sets the user ID that matches the log-on ID received from the operator terminal 20, with the telephone machine IP address specified by the telephone machine IP specifying part 101.

The user ID specifying part 103 looks up the user information table 2000 and specifies the user ID that is paired with the telephone machine IP address included in the packets transmitted from the NW switch 60.

The speech recognition text conversion part 104 applies speech recognition to the voice data included in the packets transmitted from the NW switch 60, and converts the voice represented by the voice data into text. Note that the speech recognition text conversion part 104 may convert both the operator's voice and the customer's voice into text, or may convert only one voice into text.

Also, the speech recognition text conversion part 104 transmits the text (outcome of speech recognition) to the operator terminal 20 logged on with the user ID (log-on ID) specified by the user ID specifying part 103. Furthermore, the speech recognition text conversion part 104 pairs the telephone call ID that identifies the telephone call and the user ID specified by the user ID specifying part 103, with the text, and saves the resulting telephone call history information 3000 in the telephone call history information storage part 130.

The address table storage part 110 stores the address table 1000. In the address table 1000, the IP addresses of the operator terminal 20 and the telephone machine 30 installed in the same seat are paired on a one-to-one basis. That is, for every seat, the terminal IP address of the operator terminal 20 installed at that seat and the telephone machine IP address of the telephone machine 30 installed at that seat are paired on a one-to-one basis, and stored in the address table 1000. Note that, when an operator terminal 20 or a telephone machine 30 is added or removed, or there is a change in the assignment of IP addresses, the address table 1000 is also updated accordingly.

The user information table storage part 120 stores the user information table 2000. In the user information table 2000, user IDs (log-on IDs) are stored such that they can be paired with telephone machine IP addresses. Note that, when a user ID is added, removed, and so forth, the user IDs stored in the user information table 2000 also undergo an addition, removal, and so forth accordingly.

The telephone call history information storage part 130 stores the telephone call history information 3000. The telephone call history information 3000 refers to the outcome (text) of speech recognition, in which the call ID and the user ID are paired. However, this is one example, and the telephone call history information 3000 may include, for example, the voice data of the telephone call specified by the telephone call ID, or some information obtained from the voice data (for example, information such as the speed of talk) may be added to the text.

<<Operator Terminal 20>>

As illustrated in FIG. 3, the operator terminal 20 according to this embodiment includes a log-on ID transmission part 201 and a UI control part 202. These parts are both implemented, for example, by a process executed on a processor such as a CPU by one or more programs installed in the operator terminal 20.

When an operator logs on or logs off, the log-on ID transmission part 201 transmits the log-on ID used for the log-on, to the speech recognition system 10. Note that this can be achieved, for example, by the script that is executed upon log-on or log-off.

The UI control part 202 displays the text that represents the outcome of speech recognition, transmitted from the speech recognition system 10, on a screen (for example, on the operator's screen, which will be described later). Also, in addition to this, the UI control part 202 receives various operational inputs from the operator.

<Process Upon Log-on or Log-Off>

Figure 4:
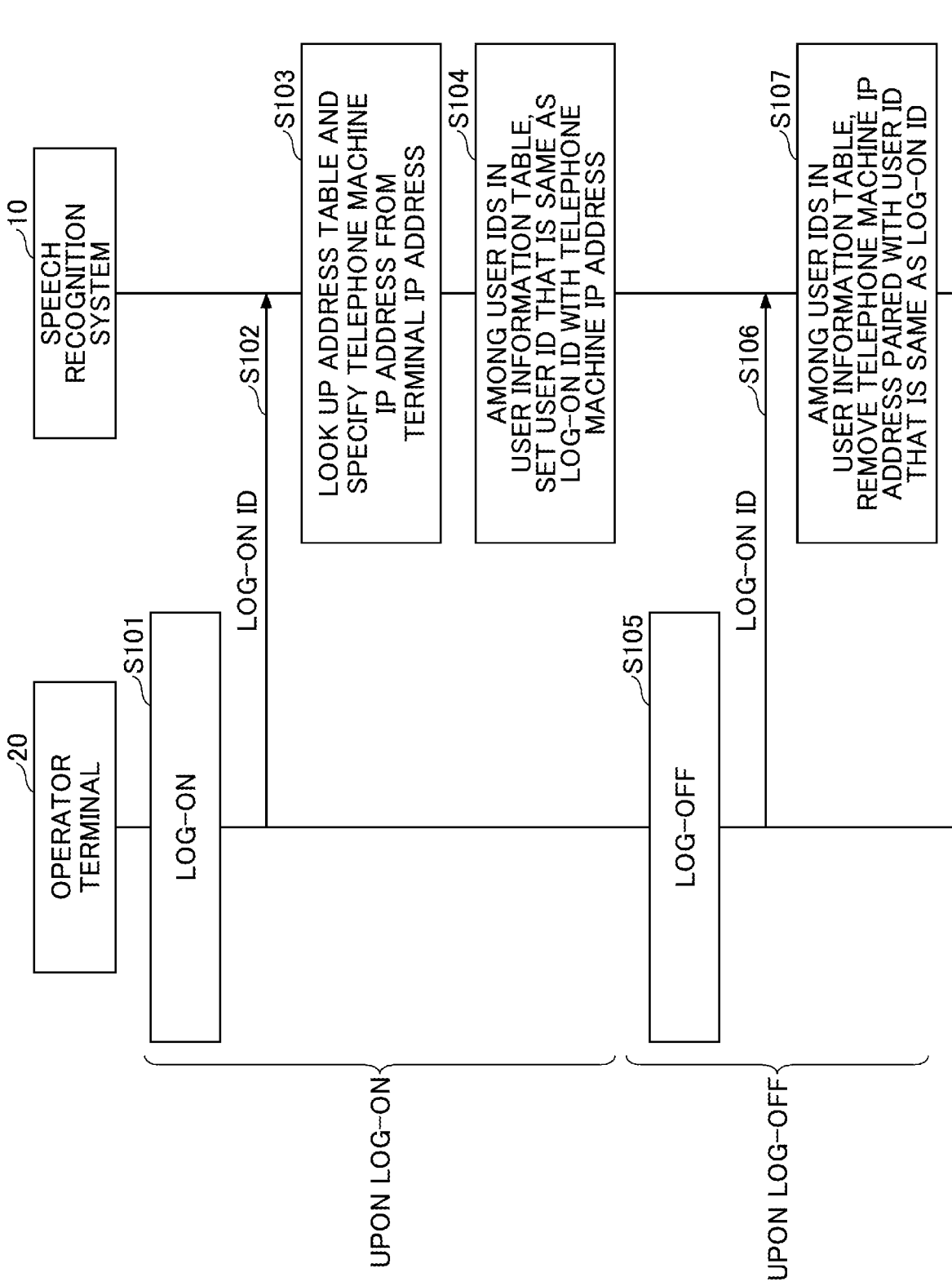
FIG. 4 is a sequence diagram that illustrates an example process upon log-on or log-off according to the first embodiment.

Below, processes that take place when an operator logs on to an operator terminal 20 and logs off from an operator terminal 20 will be described below with reference to FIG. 4. Note that steps S101 to S104 in FIG. 4 are the process upon log-in, and steps S105 to S107 are the process upon log-off.

When an operator logs on to an operator terminal 20 (step S101), the log-on ID transmission part 201 of the operator terminal 20 transmits the log-on ID used for the log-on, to the speech recognition system 10 (step S102).

When the log-on ID is received, the telephone machine IP specifying part 101 of the speech recognition system 10 looks up the address table 1000, and specifies the telephone machine IP address paired with the IP address (terminal IP address) of the operator terminal 20 from which the log-on ID arrived (step S103).

Then, among the user IDs stored in the user information table 2000, the user ID setting part 102 of the speech recognition system 10 sets the user ID that matches the log-on ID received from the operator terminal 20 with the telephone machine IP address specified in step S103 (step S104). By this means, the user ID is paired with the telephone machine IP address.

Note that this embodiment assumes that user IDs are stored in the user information table 2000 in advance, and a telephone machine IP address is paired and set with only one of these user IDs, but this is by no means limiting. For example, the user information table 2000 need not store user IDs in advance, and the log-on ID received from the operator terminal 20 and the telephone machine IP address specified in step S103 may be paired and stored in the user information table 2000.

On the other hand, when the operator logs off from the operator terminal 20 (step S105), the log-on ID transmission part 201 of the operator terminal 20 transmits the log-on ID by which the operator logged off, to the speech recognition system 10 (step S106).

The user ID setting part 102 of the speech recognition system 10 removes the telephone machine IP address paired with the user ID that matches the log-on ID received from the operator terminal 20, among the user IDs stored in the user information table 2000 (step S107). By this means, the user ID and the telephone machine IP address are unpaired.

Note that this embodiment assumes that the user information table 2000 stores user IDs in advance, and the telephone machine IP address removed above is paired with only one of these user IDs, but this is by no means limiting. For example, if no user IDS are stored in the user information table 2000 in advance, the pair of a log-on ID received from the operator terminal 20 and the telephone machine IP address paired with the log-on ID may be removed from the user information table 2000.

<Speech Recognition Process>

In what follows, it is assumed that an operator is logged on to an operator terminal 20 and talking to a customer terminal 70 by using the telephone machine 30 installed at the same seat as the operator terminal 20. The process of applying speech recognition to this telephone call and displaying the result thereof on the display of the operator terminal 20 will be described with reference to FIG. 5. Here, while the telephone call between the telephone machine 30 and the customer terminal 70 is in progress, the packets (voice packets) of the telephone call are captured by the NW switch 60, and every time a packet is buffered, or every time packets amounting to a predetermined volume of data are buffered, they are sent to the speech recognition system 10. Note that the voice packets contain the IP addresses of the telephone machine 30 and customer terminal 70 that are communicating with one another.

When a packet captured at the NW switch 60 is received (step S201), the user ID specifying part 103 of the speech recognition system 10 looks up the user information table 2000 and specifies the user ID paired with the telephone machine IP address included in the packet (step S202). As a result of this, the user ID of the operator answering the telephone call is specified, and thus the telephone call and the operator are paired.

Next, the speech recognition text conversion part 104 of the speech recognition system 10 applies speech recognition to the voice data included in the packets, and converts the voices represented by the voice data into text (step S203).

Then, the speech recognition text conversion part 104 of the speech recognition system 10 transmits the text (the outcome of speech recognition) obtained in step S203 to the operator terminal 20 where the operator having the user ID specified in step S202 is logged on (step S204).

Also, the speech recognition text conversion part 104 of the speech recognition system 10 pairs the text obtained in step S204 with the telephone call ID that identifies the telephone call and the user ID specified in step S202, and saves the resulting telephone call history information 3000 in the telephone call history information storage part 130 (step S205). Note that, although, according to this embodiment, every time text (outcome of speech recognition) is obtained, the text is paired with a telephone call ID and a user ID and saved as telephone call history information 3000 in the telephone call history information storage part 130, this is by no means limiting. For example, after a telephone call ends, the entire text obtained in the telephone call may be paired with a telephone call ID and a user ID and saved as telephone call history information 3000 in the telephone call history information storage part 130.

Figure 6:
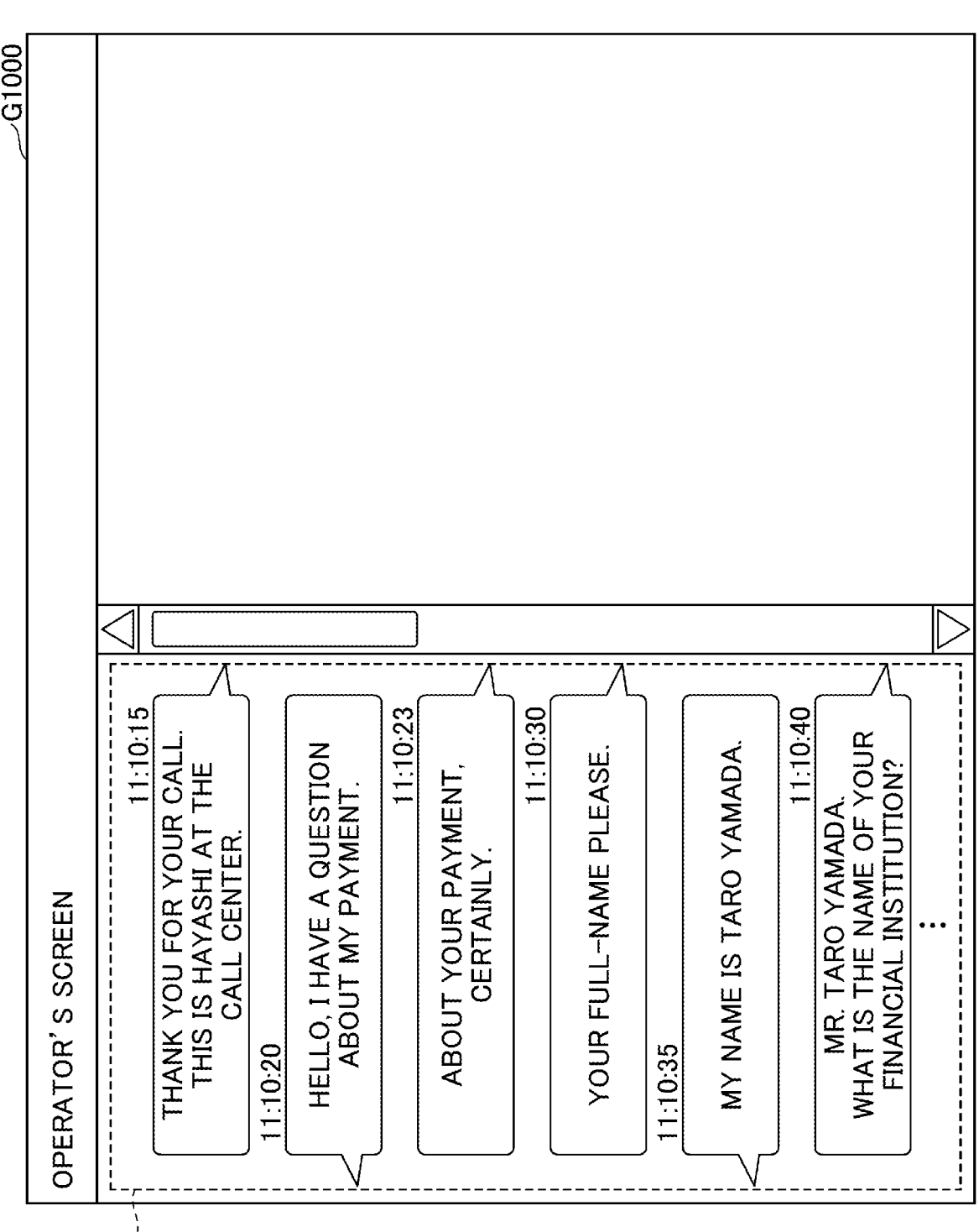
FIG. 6 is a diagram that illustrates an example of an operator's screen.

Upon receiving text that represents an outcome of speech recognition, the UI control part 202 of the operator terminal 20 displays this text on a display (step S206). For example, it is assumed here that the operator's screen G1000 illustrated in FIG. 6 is displayed on the display of the operator terminal 20. This operator's screen G1000 includes a talk display part G1100 where the talk between the operator and the customer is displayed in text. When text that represents an outcome of speech recognition is received, the UI control part 202 displays the text in the talk display part G1100, in chronological order, on a per speaker basis. This allows the operator to check the content that each speaker speaks during a telephone call, in text, on a real-time basis.

Second Embodiment

Next, a second embodiment will be described. A case will be described below, with the second embodiment, in which a telephone call and an operator are paired without using the address table 1000. Note that the second embodiment will mainly focus on differences from the first embodiment, and elements that are the same as in the first embodiment will not be described.

<Method of Pairing Up Telephone Calls and Operators>

Figure 7:
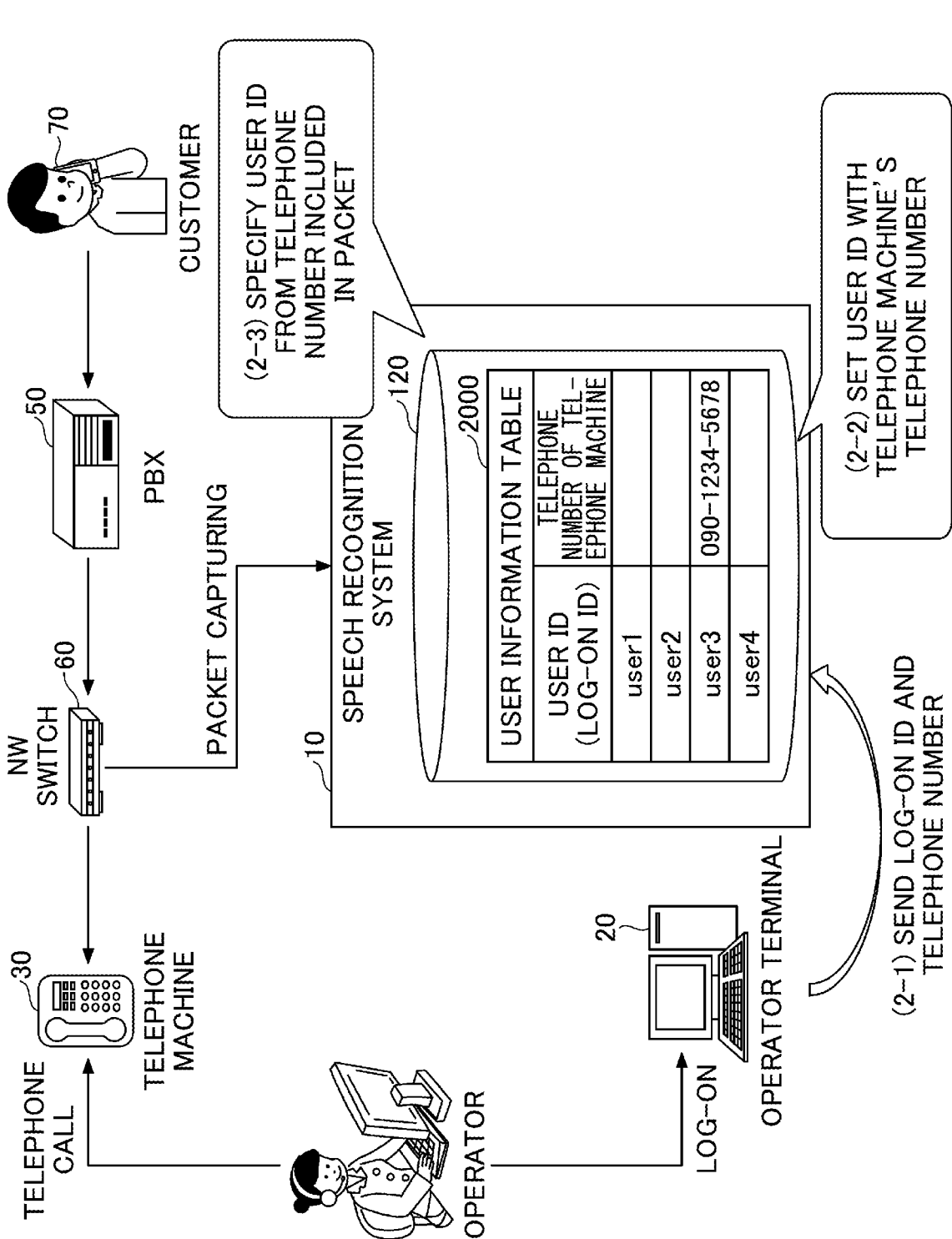
FIG. 7 is a diagram for explaining an example method of pairing up telephone calls and operators according to a second embodiment.

An example method of pairing up telephone calls and operators in the contact center system 1 according to this embodiment will be described below with reference to FIG. 7.

The contact center system 1 according to this embodiment pairs up a telephone call and an operator through (2-1) to (2-3) below:

(2-1)

First, when an operator logs on to an operator terminal 20, the operator terminal 20 transmits the log-on ID used for the log-on, to the speech recognition system 10. Note that this telephone number may be set in advance in the operator terminal 20, for example, in the form of a setting file or the like.

(2-2)

The speech recognition system 10 according to this embodiment has a user information table storage part 120. In the user information table 2000, user IDs (log-on IDs) are stored such that the user IDs can be paired with the telephone numbers of the telephone machines 30. Note that, for example, before the telephone numbers of the telephone machines 30 and the user IDs (log-on IDs) are paired, only the user IDs (log-on IDs) are stored in the user information table 2000 (or user IDs (log-on IDs) paired with NULL values or blanks instead of the telephone numbers of the telephone machines 30 are stored).

In this setting, if the speech recognition system 10 receives a log-on ID and a telephone number from an operator terminal 20, the speech recognition system 10 sets the user ID that matches the log-on ID, among the user IDs stored in the user information table 2000, with the telephone number together. In the example illustrated in FIG. 7, for example, if the log-on ID is "user3" and the telephone number is "090-1234-5678," the log-on ID "user3" and the telephone number "090-1234-5678" are paired up and set together.

(2-3)

Subsequently, when a telephone call takes place between a telephone machine 30 and a customer terminal 70 via the PBX 50, the NW switch 60 captures the packets (voice packets) of the telephone call and sends them to the speech recognition system 10. Note that the packets include the telephone number of the telephone machine 30.

The speech recognition system 10 looks up the user information table 2000, and specifies the user ID that is paired with the telephone number included in the packets. As a result of this, the user ID of the operator answering the telephone call is specified, and the telephone call and the operator identified by the user ID are paired.

<Functional Structure of Contact Center System 1>

Figure 8:
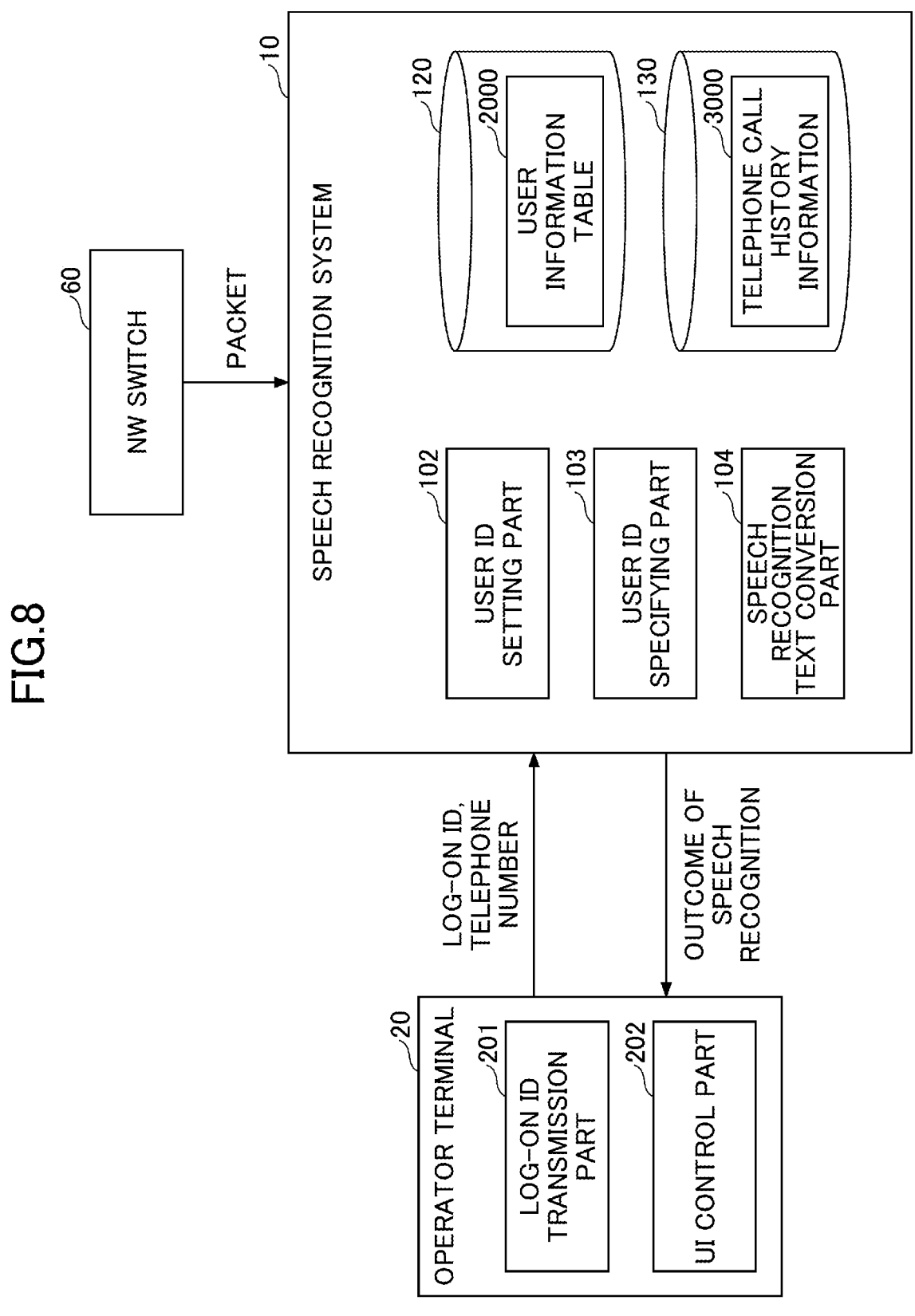
FIG. 8 is a diagram that illustrates an example functional structure of a contact center system according to the second embodiment.

FIG. 8 shows a functional structure of the speech recognition system 10 and operator terminal 20 included in the contact center system 1 according to this embodiment.

<<Speech Recognition System 10>>

As illustrated in FIG. 8, the speech recognition system 10 according to this embodiment differs from the first embodiment in that it does not have the telephone machine IP specifying part 101 and the address table storage part 110. Also, this embodiment differs from the first embodiment in that the user information table 2000 stores user IDs (log-on IDs) such that they can be paired with the telephone numbers of the telephone machines 30.

<<Operator Terminal 20>>

As illustrated in FIG. 8, the operator terminal 20 according to this embodiment has a log-on ID transmission part 201 and a UI control part 202 as in the first embodiment. However, the operator terminal 20 according to this embodiment differs from the first embodiment in that, when an operator logs on, the log-on ID transmission part 201 sends the telephone number, in addition to the log-on ID.

<Process Upon Log-on or Log-Off>

Figure 9:
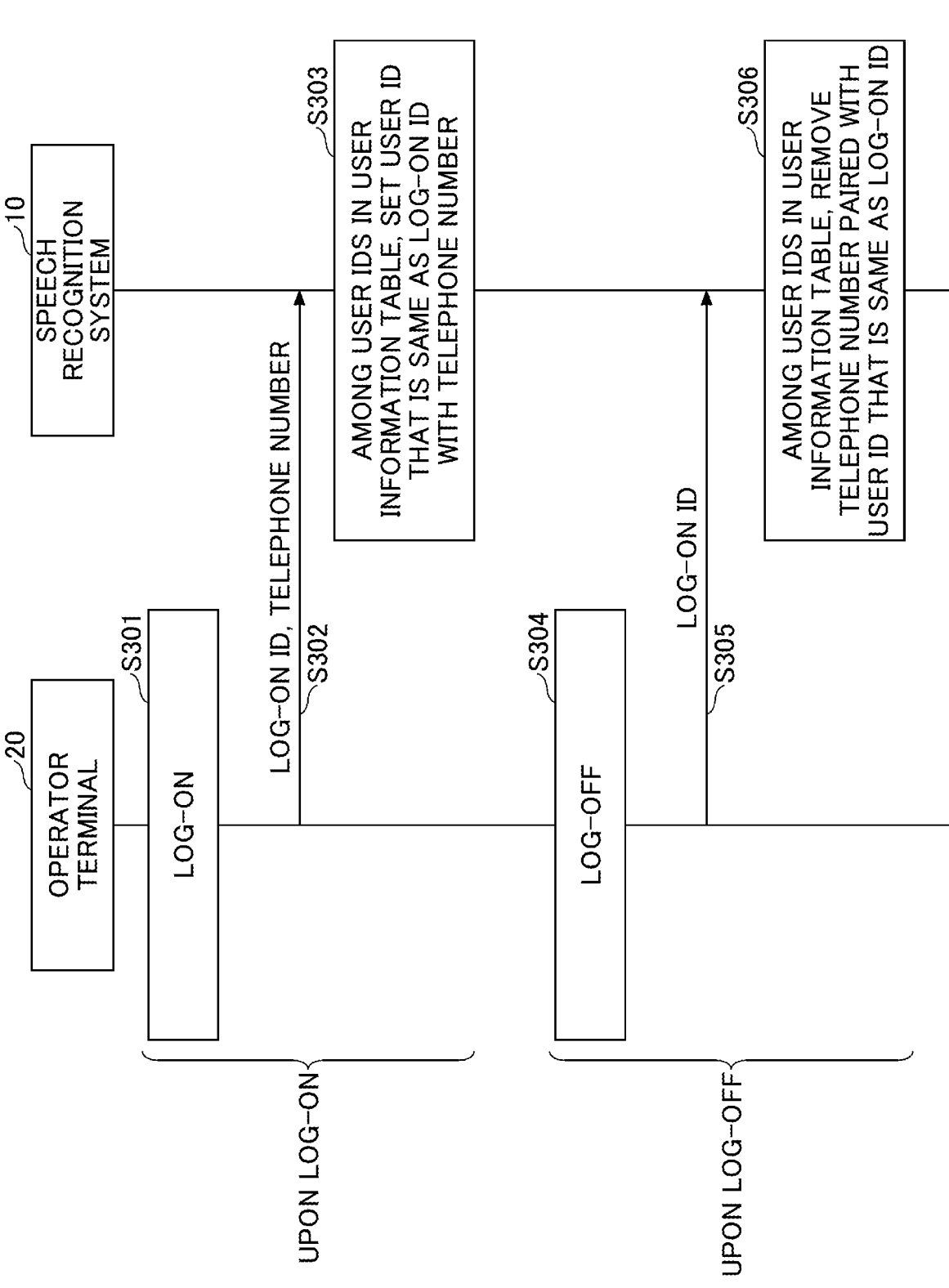
FIG. 9 is a sequence diagram that illustrates an example process upon log-on or log-off according to the second embodiment.

Below, processes that take place when an operator logs on to an operator terminal 20 and logs off from an operator terminal 20 will be described below with reference to FIG. 9. Note that steps S301 to S303 in FIG. 9 are the process upon log-in, and steps S304 to S306 are the process upon log-off.

When an operator logs on to an operator terminal 20 (step S301), the log-on ID transmission part 201 of the operator terminal 20 transmits the log-on ID used for the log-on, and the telephone number of the telephone machine 30 installed in the same seat as the operator terminal 20, to the speech recognition system 10 (step S302). Note that the telephone number of the telephone machine 30 installed at the same seat is set in advance in the operator terminal 20 in the form of a setting file or the like.

When the user ID and telephone number arrive from the operator terminal 20, the user ID setting part 102 of the speech recognition system 10 sets the user ID that matches the log-on ID, among the user IDs stored in the user information table 2000, with the telephone number (step S303). By this means, the user ID is paired with the telephone number.

Note that this embodiment assumes that user IDs are stored in the user information table 2000 in advance, and a telephone number is paired and set with only one of these user IDs, but this is by no means limiting. For example, the user information table 2000 need not store user IDs in advance, and the log-on ID and telephone number received from the operator terminal 20 may be paired and stored in the user information table 2000.

On the other hand, when the operator logs off from the operator terminal 20 (step S304), the log-on ID transmission part 201 of the operator terminal 20 transmits the log-on ID by which the operator logged off, to the speech recognition system 10 (step S305).

The user ID setting part 102 of the speech recognition system 10 removes the telephone number paired with the user ID that matches the log-on ID received from the operator terminal 20, among the user IDs stored in the user information table 2000 (step S306). By this means, the user ID and the telephone number are unpaired.

Note that this embodiment assumes that the user information table 2000 stores user IDs in advance, and the telephone number removed above is paired with only one of these user IDs, but this is by no means limiting. For example, if no user IDs are stored in the user information table 2000 in advance, the pair of a log-on ID received from the operator terminal 20 and the telephone number paired with the log-on ID may be removed from the user information table 2000.

<Speech Recognition Process>

Figure 10:
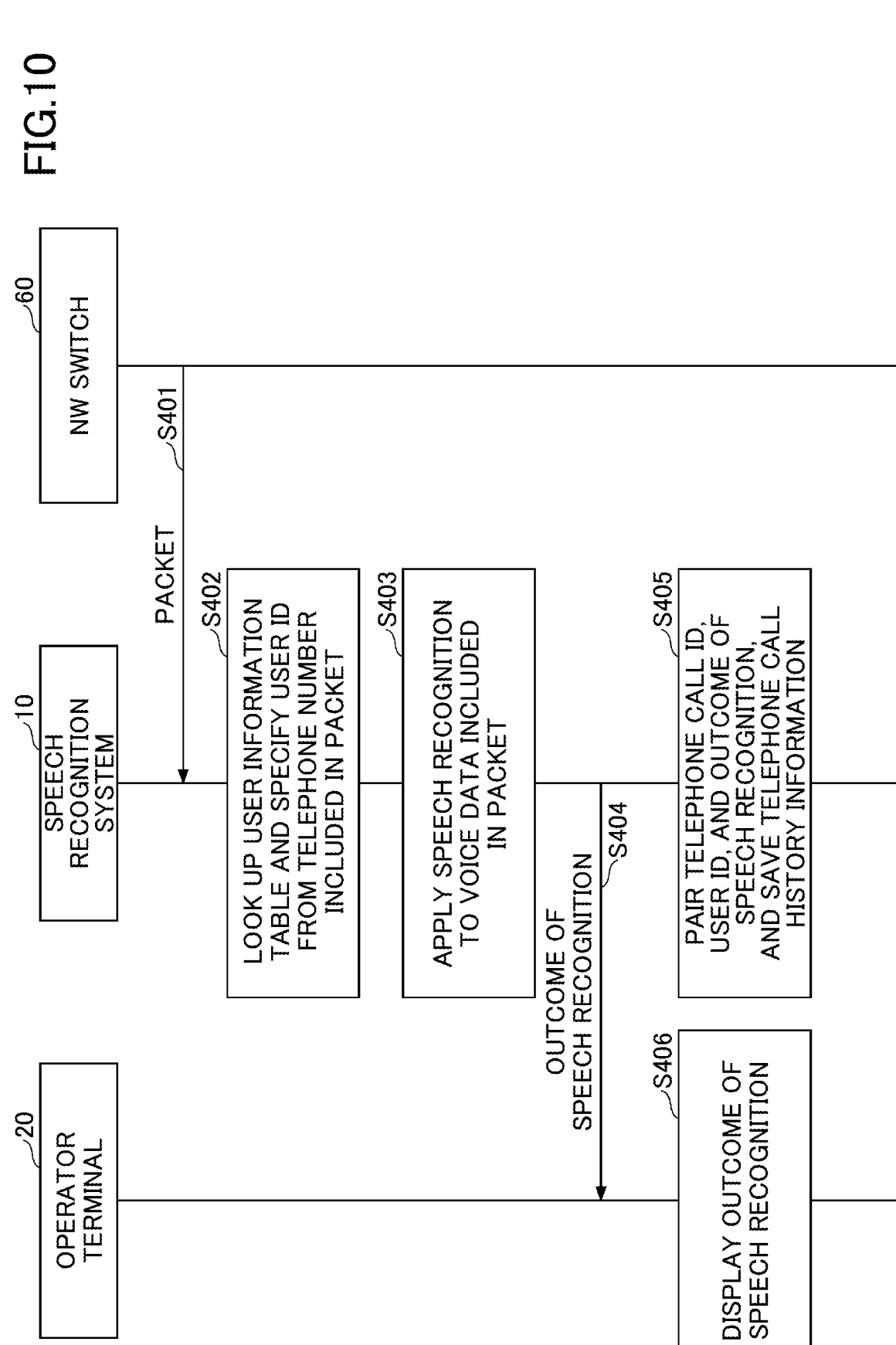
FIG. 10 is a sequence diagram that illustrates an example of speech recognition processing according to the second embodiment.

The speech recognition process according to this embodiment will be described below with reference to FIG. 10. Note that the voice packets of the telephone call between the telephone machine 30 and the customer terminal 70 include the telephone numbers of the telephone machine 30 and the customer terminal 70 that are communicating with one another.

When a packet captured at the NW switch 60 is received (step S401), the user ID specifying part 103 of the speech recognition system 10 looks up the user information table 2000 and specifies the user ID paired with the telephone number included in the packet (step S402). As a result of this, the user ID of the operator answering the telephone call is specified, and thus the telephone call and the operator are paired.

Subsequent steps S403 to S406 are similar to or the same as steps S203 to S206 in FIG. 5, respectively.

MODIFICATIONS

Modifications of each embodiment described above will be described below.

Modification 1

In the first embodiment, a call and an operator are paired by using IP addresses; however, it is equally possible to use media access control (MAC) addresses instead of IP addresses. In this case, the MAC address of the operator terminal 20 and the MAC address of the telephone machine 30 installed in the same seat are paired on a one-to-one basis and stored in the address table 1000. Also, in the user information table 2000, user IDs (log-on IDs) are stored such that they can be paired with the MAC addresses of the telephone machines 30. Note that, besides MAC addresses, if there is information that can be obtained from voice packets and that can identify the telephone machines 30, this information may be used instead of IP addresses.

Modification 2

In the first and second embodiments, an operator terminal 20 and a telephone machine 30 are installed at each operator's seat; however, for example, a software telephone may be installed in all or some of the operator terminals 20. In this case, the telephone machines 30 need not be installed in seats where the software telephone is installed in the operator terminal 20. Note that, in this case, in the first embodiment, the IP addresses of the operator terminals 20 (terminal IP addresses) in which the software telephone is installed match the telephone machine IP addresses.

EXAMPLE APPLICATIONS

Pairing up telephone calls and operators not only allows each operator to check, on a real-time basis, the content that he/she speaks during a telephone call, but also makes it possible to implement various functions that are enabled when CTI cooperation is used. Examples of such functions will be described below as example applications. Note that, obviously, in addition to the example applications described below, a variety of other functions can be implemented as well when CTI cooperation is used.

Example Application 1

By pairing up telephone calls and operators, the manager can use the manager terminal 40 and check the content spoken in telephone calls in text, on a per operator basis, in real time or off-line.

Figure 11:
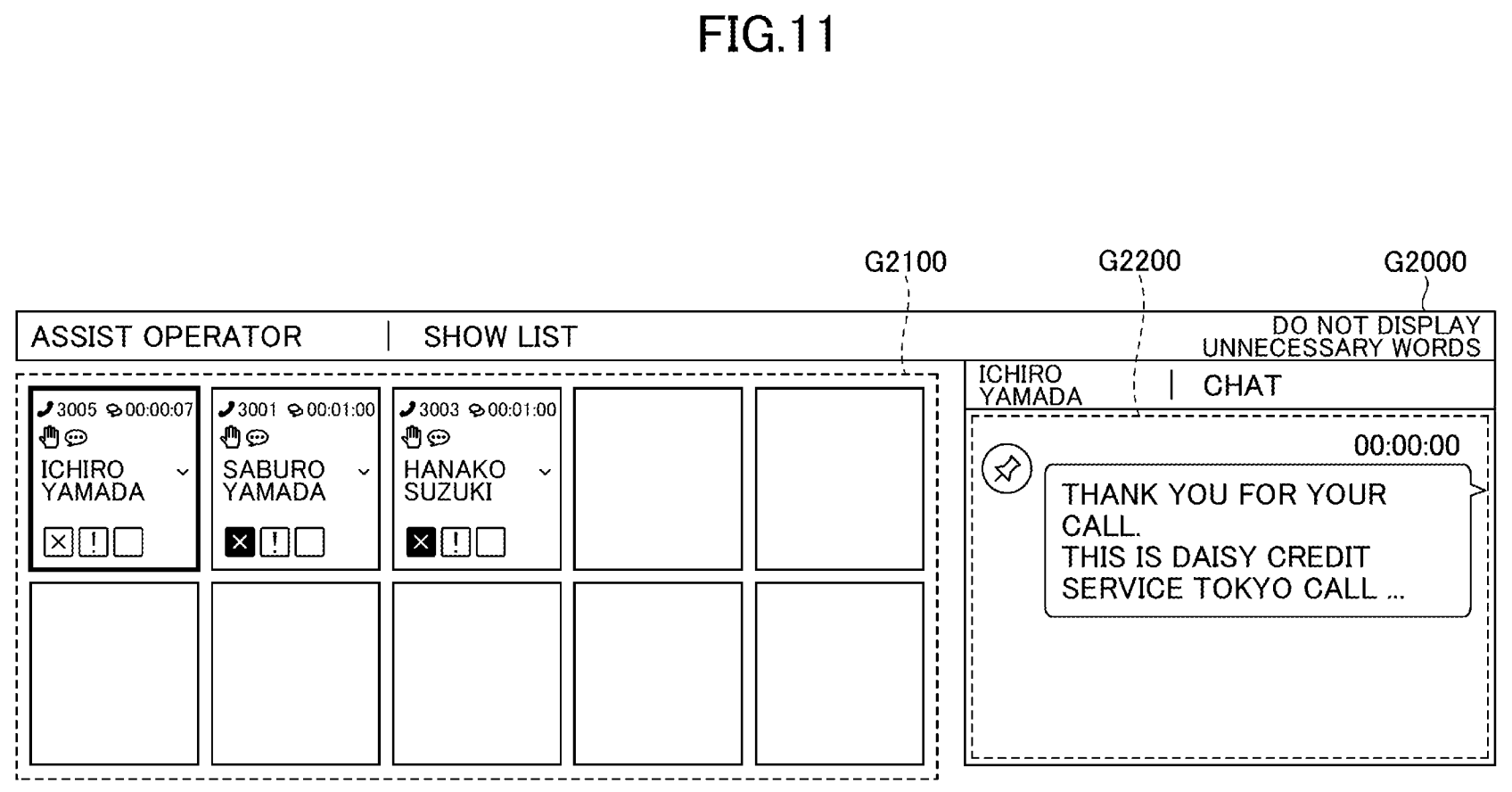

For example, the operator assist screen G2000 illustrated in FIG. 11 is displayed on a display of the manager terminal 40. This operator assist screen G2000 includes: a telephone call selection part G2100 that displays a list of telephone calls and the names of the operators who took these telephone calls; and a talk content display section G2200 that displays, in text, the content spoken during the telephone calls selected on the telephone call selection part G2100. Consequently, the manager can check a call of interest from the telephone call selection section G2100, and check the content spoken during this call in the talk content display section G2200. This enables the manager to, for example, assist inexperienced operators, check whether or not the operators are not talking inappropriately, and so forth.

In addition to this, for example, it is also possible to search the telephone call history information 3000 of an operator of interest by using the operator's user ID as a key, and display the outcomes of speech recognition included in the telephone call history information 3000 on the manager terminal 40.

Example Application 2

By analyzing the telephone call history information 3000 from a variety of perspectives (for example, based on whether or not appropriate words are used in each scene, whether or not each operator's speed of talk is appropriate, what tendencies in talk each operator has, and so forth) and evaluating the quality of service in answering telephone calls, it is possible to facilitate, for example, improvements in the level of customer satisfaction. The results of evaluating the quality of service are displayed on the display of the manager terminal 40 (or on the operator terminal 20, on the terminal used by quality personnel, etc.).

Figure 12:
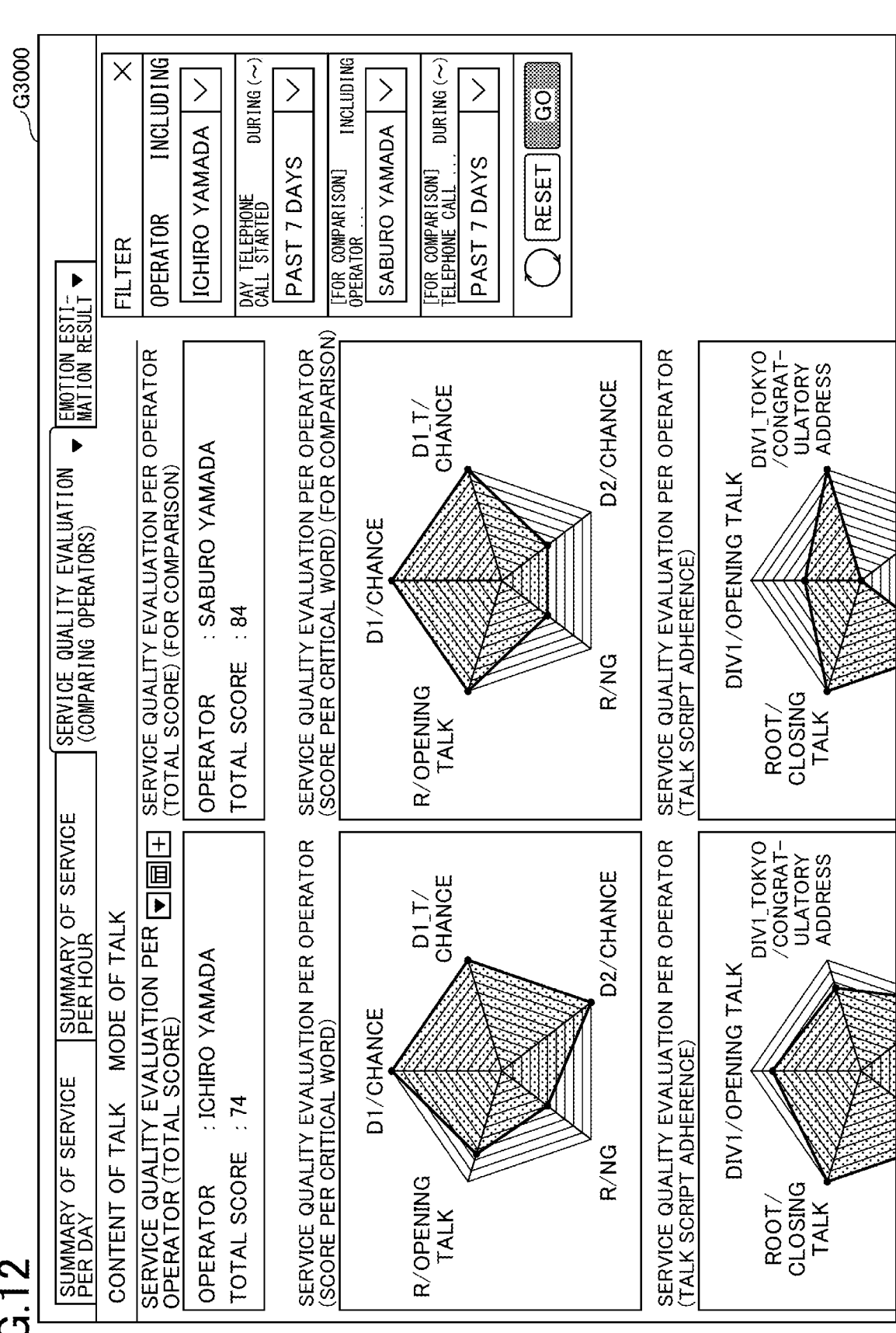
FIG. 12 is a diagram for explaining an example application (part 2).

For example, it is possible to display a service quality evaluation screen G3000, such as the one illustrated in FIG. 12, on the display of the manager terminal 40. The service quality evaluation screen G3000 illustrated in FIG. 12 is a screen on which every operator's quality of service in answering telephone calls is scored, so as to allow comparison. This allows the managers, quality supervisors, and so forth to discuss measures for improvements in the quality of service in answering telephone calls, train the operators, and so forth.

SUMMARY

As described above, the contact center system 1 according to the herein-contained embodiments makes it possible to pair a telephone call and the operator answering the telephone call, by using information obtained from the operator terminal 20 installed at the same seat as the telephone machine 30 (the log-on ID, or the log-on ID with the telephone number of the telephone machine 30). As a result of this, the contact center system 1 according to the herein-contained embodiments can implement, without using CTI cooperation, various functions that would be enabled if CTI cooperation were used. Therefore, even when there are various reasons that make introduction of CTI difficult (for example, when the existing PBX is not functionally compatible with CTI cooperation function or lacks the capacity, but the cost of replacing the PBX is not affordable either), it is still possible to implement various functions, such as ones to support the operators in performing their duties, evaluate the quality of telephone calls, and so forth.

The present invention is by no means limited to the embodiments described above in detail, and a variety of modifications and changes, combinations with existing techniques, and so forth are possible without departing from the scope of the claims attached herewith.

This application is based on Japanese Patent Application No. 2021-163442, filed Oct. 4, 2021, the entire content of which is incorporated herein by reference.

REFERENCE SIGNS LIST 1 contact center system
10 speech recognition system

20 operator terminal
30 telephone machine
40 manager terminal
50 PBX
60 NW switch
70 customer terminal
80 communication network
101 telephone machine IP specifying part
102 user ID setting part
103 user ID specifying part
104 speech recognition text conversion part
110 address table storage part
120 user information table storage part
130 telephone call history information storage part
201 log-on ID transmission part
202 UI control part
1000 address table
2000 user information table
3000 telephone call history information
E contact center environment

The invention claimed is:

1. An information processing device comprising:

at least one processor; and memory storing instructions that, when executed by the at least one processor, causes the device to perform a set of operations, the set of operations comprising:

receiving a user identification information wherein the user identification information identifying a user using a given communication device having a communication device IP address;

receiving, an operator terminal IP address and the communication device IP address from an operator, wherein the operator terminal IP address and the communication device IP address are paired together;

pairing the user identification information and the communication device IP address; storing the paired information;

receiving second information being a speech recognition information obtainable from a voice packet of a call between the given communication device and another communication device; and wherein the paired information and the speech recognition information are associated to form stored information, in which the stored information allows search by using the user identification information as a key and thus allowing a predetermined analysis for evaluating quality of service, wherein the predetermined analysis further includes analysis of tendencies in talk per user identification information.

2. The information processing device according to claim 1, wherein the first information includes a log-on ID of the terminal, wherein the log-on ID and the user identification information related to a same user match or are paired together, and wherein the user identification information is paired and set to match or is paired with the log-on ID, with the second information.

3. The information processing device according to claim 2, wherein the second information comprises an IP address or MAC address of the communication device, wherein, based on an IP address or MAC address of the terminal from which the first information is transmitted, the IP address or MAC address of a communication device corresponding to the terminal is specified, wherein the IP address or MAC address of the communication device is paired and set with same user identification information as the log-on ID, and wherein the IP address or MAC address of the communication device is obtained from the voice packet, and specifies the user identification information paired with the IP address or MAC address obtained.

4. The information processing device according to claim 3, wherein the IP address or MAC address of the terminal and the IP address or MAC address of the given communication device are referenced in a table and paired on a one-to-one basis, and specifies the IP address or MAC address of the given communication device corresponding to the terminal.

5. The information processing device according to claim 2, wherein the first information further includes a number of the given communication device, wherein the second information is the number of the given communication device, wherein the user identification information is paired and set, which is the same as the log-on ID, with the number included in the first information, and wherein the number of the given communication device is obtained from the voice packet, and specifies user identification information paired with the number obtained.

6. The information processing device according to claim 1, further configured to apply speech recognition to voice data included in the voice packet, wherein an outcome of the speech recognition is transmitted to the terminal used by the user having the user identification information specified.

7. An information processing method to be executed on a computer, the method comprising:

receiving a user identification information wherein the user identification information identifying a user using a given communication device having a communication device ID address;

receiving, an operator terminal IP address and the communication device IP address from an operator, wherein the operator terminal IP address and the communication device IP address are paired together;

pairing the user identification information and the communication device IP address; storing the paired information;

receiving second information being a speech recognition information obtainable from a voice packet of a call between the given communication device and another communication device; and wherein the paired information and the speech recognition information are associated to form stored information, in which the stored information allows search by using the user identification information as a key and thus allowing a predetermined analysis for evaluating quality of service, wherein the predetermined analysis further includes analysis of tendencies in talk per user identification information.

8. A computer-readable non-transitory recording medium storing computer-executable program instructions what when executed by at least one processor that causes a computer to execute instructions comprising:

receiving a user identification information wherein the user identification information identifying a user using a given communication device having a communication device IP address;

receiving, an operator terminal IP address and the communication device IP address from an operator, wherein the operator terminal IP address and the communication device IP address are paired together;

pairing the user identification information and the communication device IP address; storing the paired information;

receiving second information being a speech recognition information obtainable from a voice packet of a call between the given communication device and another communication device; and wherein the paired information and the speech recognition information are associated to form stored information, in which the stored information allows search by using the user identification information as a key and thus allowing a predetermined analysis for evaluating quality of service, wherein the predetermined analysis further includes analysis of tendencies in talk per user identification information.

\* \* \* \* \*